United States Patent
Kothari et al.

(10) Patent No.: US 7,747,494 B1
(45) Date of Patent: *Jun. 29, 2010

(54) NON-DETERMINATIVE RISK SIMULATION

(76) Inventors: Pravin Kothari, 6229 Dovetail Ct., San Jose, CA (US) 95135; Yuh-Wen Soung, 12764 Rodoni Ct., Saratoga, CA (US) 95070; Zhangmin Wang, 121 Montelena Ct., Mountain View, CA (US) 94040

( * ) Notice: Subject to any disclaimer, the term of this patent is extended or adjusted under 35 U.S.C. 154(b) by 163 days.

This patent is subject to a terminal disclaimer.

(21) Appl. No.: 11/439,771

(22) Filed: May 24, 2006

(51) Int. Cl.
*G06Q 30/00* (2006.01)
(52) U.S. Cl. .............................. 705/35; 705/38; 705/39; 705/42; 705/44
(58) Field of Classification Search ............. 705/35–44; 700/90; 708/100
See application file for complete search history.

(56) References Cited

U.S. PATENT DOCUMENTS

| | | | |
|---|---|---|---|
| 2002/0194119 A1* | 12/2002 | Wright et al. ................. 705/38 |
| 2003/0153991 A1* | 8/2003 | Visser et al. ................... 700/79 |
| 2005/0228688 A1* | 10/2005 | Visser et al. .................... 705/1 |
| 2006/0265324 A1* | 11/2006 | Leclerc et al. ................ 705/38 |
| 2006/0265751 A1* | 11/2006 | Cosquer et al. ............... 726/25 |
| 2007/0067845 A1* | 3/2007 | Wiemer et al. ................ 726/25 |
| 2007/0067846 A1* | 3/2007 | McFarlane et al. ........... 726/25 |
| 2007/0067847 A1* | 3/2007 | Wiemer et al. ................ 726/25 |

* cited by examiner

*Primary Examiner*—James P Trammell
*Assistant Examiner*—Hai Tran
(74) *Attorney, Agent, or Firm*—Ash Tankha (57) ABSTRACT

Simulating risk circumstances can reveal new information to risk assessment personnel about how to mitigate risk. In one embodiment, the present invention includes selecting an asset from a plurality of heterogeneous assets of a business enterprise. The user can then input a plurality of simulated risk factors for the selected asset into the system which receives this input. The risk assessment system can then generate a non-determinative simulated risk score using the simulated risk factors, the simulated risk score being a simulated measure of risk associated with the selected asset if the selected asset were to be associated with the plurality of simulated risk factors.

22 Claims, 7 Drawing Sheets

NON-DETERMINATIVE RISK SIMULATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention apply to the field of network security and risk assessment, more specifically enterprise risk assessment.

2. Description of the Related Art

Modern business enterprises operate in a complex regulatory environment. Many enterprises must comply with various government regulations both on the federal level and on the state and local levels. For example, most public corporations (at the present time any publicly traded corporation with fifty million or more market capitalization) must comply with the Sarbanes-Oxley Act of 2002. Financial enterprises, heath related enterprises, and other more stringently regulated industries have their own regulatory frameworks.

Furthermore, many business enterprises have internal policies and controls independent of government regulation. These controls and policies may be concerned with security, confidentiality maintenance, trade secret protection, access control, best practices, accounting standards, business process policies, and other such internal rules and controls. The cost of complying with all regulations, rules, policies, and other requirements can be substantial for a large scale business enterprise.

One common problem faced by business enterprises in the control/policy/regulation compliance area is risk assessment and mitigation. Current risk models use determinative formulas and models to calculate risks associated with assets. One problem with determinative risk formulas and models is that no new information can be gained by attempting to mitigate risks by simulating inputs to the determinative formulas and models. For example, a determinative risk formula may calculate risk as threat severity multiplied by likelihood of threat and then multiplied by impact of threat. Since the formula is fixed, it is clear how much a reduction in the inputs will reduce the risk. Thus, a risk assessment professional can gain no new knowledge about risk mitigation from such linear determinative models and formulas.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Compliance Management System

Figure 1:
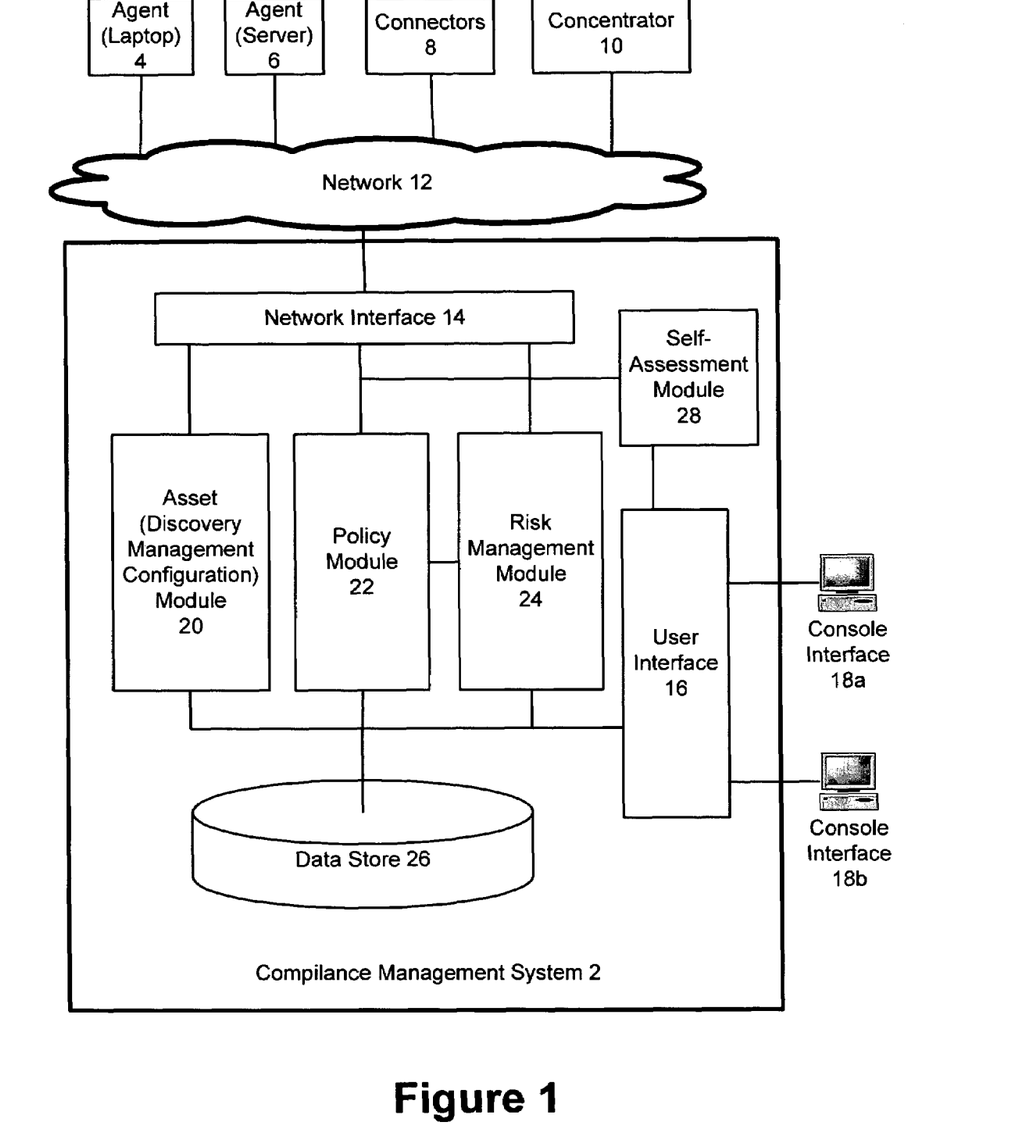
FIG. 1 is a block diagram illustrating a compliance management system according to one embodiment of the present invention.

One embodiment of the invention is now described with reference to FIG. 1. FIG. 1 shows a compliance management system 2. In one embodiment, the compliance management system 2 is provided as a stand-alone appliance that connects to a network, but the compliance management system 2 can be provided in other ways, such as software running on a server, distributed software, or various software and hardware packages operating together.

The compliance management system 2 connects to a network 12—such as a local area network (LAN), Intranet network segment, or the Internet—and can collect data from various sources. For example, the compliance management system 2 can collect data from agents 4 and 6. Agent 4 is an agent associated with and overseeing a laptop (in this example) and agent 6 is associated with a server. In a real-world embodiment, there could be thousands of agents associated with thousands of separate assets.

The compliance management system 2 can also collect information from various collectors 8. Collectors 8 can be custom designed connectors to connect to various network devices and network management and security products already installed by the enterprise. For example, the connectors 8 can enable the compliance management system 2 to connect to, and collect data from, routers, firewalls, directories (such as Microsoft's Active Directory), vulnerability scanners, security information management (SIM) products, enterprise risk management (ERM) products and other such products and applications. Also, some deployments of the compliance management system 2 may not use distributed agents at all, in which case information regarding various assets can be collected via an agent-less concentrator (also referred to sometimes as an aggregator) 10.

In one embodiment, the compliance management system 2 implements asset discovery, configuration, and management functionalities. Such functionality can be provided in the asset module 20 shown in FIG. 1. In one embodiment, the asset module interfaces with the various agents, connectors, and concentrators 2-10 (referred to collectively as "software interfaces" or "distributed software interfaces" for simplicity) via the network interface 14 that connects the compliance management system 2 to the network 12. The asset module 20 performs asset discovery by collecting information about all assets connected to and/or visible to the network 12.

Such assets can include, but are not limited to, laptops, desktops, workstations, operating systems and other applications, servers, users, routers, intrusions detection devices (IDS), firewalls, printers, and storage systems. Assets can be imported from various connected applications, such as vulnerability scanners, directory applications, ERM, SIM, and other security-related products, and so on. Assets can also be non-information technology assets, such as people, users, buildings, and so on. Some assets, such as buildings, departments, and networks include other assets.

In one embodiment, the asset module 20 can also be used to configure asset attributes. This can be done by an operator of the compliance management system 2 via the user interface 16 exposed to the user by consoles 18*a* and 18*b*. There may be more or less consoles, which will be collectively referred to as console interface 18.

For example, an agent can report a newly discovered laptop computer. The agent can automatically report back on available attributes, such as central processing unity (CPU) type, the operating system running on the laptop, the types of memory installed, and so on. A user (typically a system administrator) can then add extra attributes to the laptop, such as business owner, business classification, group, and other similar attributes.

The discovered and configured assets can be stored, in one embodiment, in data store 26. Data store 26 can be implemented as a disk, a data server, or some other physical storage means. It can reside inside or outside of the compliance management system 2. The data store 26 can include various databases. One such database can be an asset database, having records corresponding with managed assets. The assets discovered and stored in the asset database can be managed, in one embodiment, from the console interface 18 by editing various attributes of the assets.

In one embodiment, policy compliance functionality is provided by the system 2 by implementing a policy module 22. The policy module 22 can enable a user—via the user interface 16—to author and edit policies and policy templates and apply policies to various assets. The policy module 22 also maintains a policy database in the data store 22. In one embodiment, policies can also be labeled, grouped and organized according to certain predefined roles for personnel. For example, "engineer level 1" can be a role that has a list of specific policies, associated with it.

In one embodiment, the compliance management system 2 also provides risk management functionality by implementing a risk management module 24. Such system could be called a compliance/risk management system, or risk management system, but to avoid confusion, the system will be referred to as a compliance management system 2. The risk assessment module 24 analyzes multiple sources of information, including the compliance management system 2, to determine the risk the enterprise is exposed to. In one embodiment, the risk management module collects information—in addition to the compliance management system—from the enterprise's vulnerability assessment systems, SIM systems, asset configurations, and network traffic reports. Other sources of information may be used as well. In one embodiment, the risk management module determines a simple metric to express the enterprise's risk profile using all the collected information.

Figure 2:
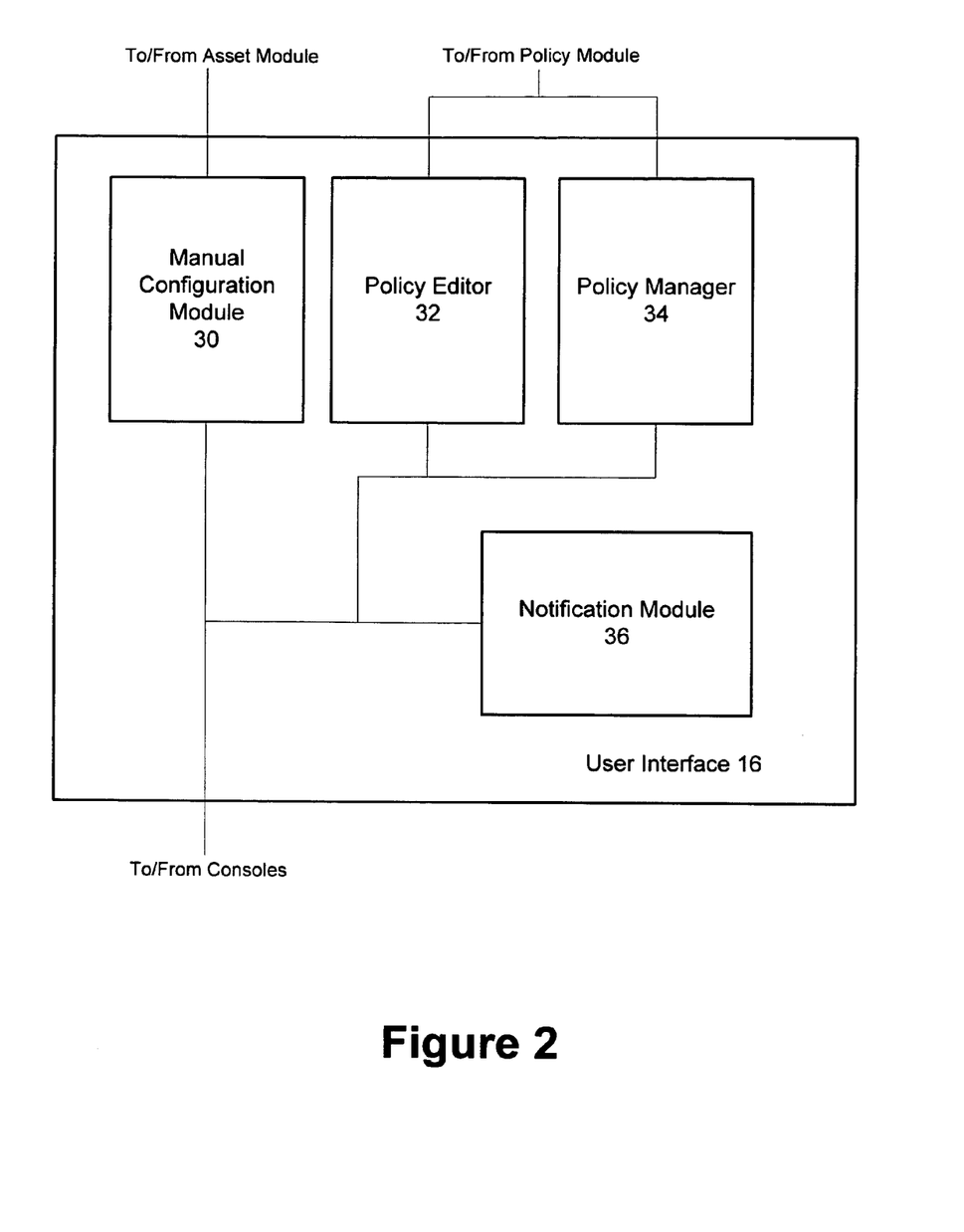
FIG. 2 is a block diagram illustrating a user interface module for a compliance management system according to one embodiment of the present invention.

As mentioned above, the compliance management system 2 also includes a user interface 16 which is exposed to users of the system 2 by consoles 18. In one embodiment the consoles 18 are browser-based, allowing for administration and use of the system 2 from any network-attached work station, or through a remote network connection. In one embodiment, the user interface enables an administrator to select from a list of regulations—such as Sarbanes-Oxley (SOX), Gramm-Leach-Bliley Act (GLBA), Health Insurance Portability and Accountability Act (HIPPA), Card Holder Information Regulation Program (CISP)—and display functionality relevant to the selected regulation. Similarly, the user interface can enable an administrator to select from a list of standard frameworks—such as ISO-17799, Control Objectives for Information and related Technologies (COBIT)—and display functionality relevant to the selected regulation or framework. FIG. 2 provides a more detailed view of the user interface 16 according to one embodiment of the present invention.

The user interface 16 can implement a manual configuration module 30 that allows the user to manually configure asset attributes, as described in the example of the laptop being assigned to a business owner (and other user-defined attributes) above. The user interface can also implement a policy editor 32. The policy editor 32 can assist users in naming and authoring policies.

The policy editor 32 can also provide access to a policy template database stored on the data store 26 having template policies. A user can then create a specific policy instance using a preconfigured template by saving the policy instance as a policy. The policy editor 32, in one embodiment, also includes access to a script-based policy language that allows for highly flexible authoring of almost any type of desired policy. In addition, the policy editor 32 can be used to edit saved policies and policies from various preconfigured policy databases as well as author and edit policy templates.

In one embodiment, the policies that can be authored by the policy editor 32 are highly flexible. Such policies include technology-based policies, such as password length and firewall configurations. Furthermore, some policies can be process related, ensuring that certain process owners take certain actions. Yet other types of polices can include some that cannot be automatically enforced in an information technology sense. For example, risk assessment surveys must be manually filled out by someone responsible for the domain being surveyed, and a policy can include the requiring of such a survey being filled out periodically. Since such policies require at least some human interaction, they are sometimes referred to herein as "manual" policies.

The user interface 16 can also implement a policy manager 34. The policy manager 34 allows the user to organize and apply policies. Policies can be associated with controls that are designed to mitigate against specific threats, as defined in various standards, such as ISO-17799. In one embodiment, the policy manager can be used to identify threats, define (or import) controls, and associate policies to controls to implement the controls. One control may be implemented using several policies, and a policy may be occasionally used in multiple controls. In one embodiment, policies are applied directly to assets or groups of assets. The user interface 16 can also include a notification module 36 to send alerts and reports regarding compliance management and risk analysis.

Returning to referencing FIG. 1, the compliance management system 2 can also include a self-assessment module 28. The self-assessment module 28 maintains and accesses various self-assessment surveys that can be stored in data store 26. The self-assessment module 28 may periodically, or under the direction of the policy module 22 or the user interface 16, send surveys to various individuals for completion. The self-assessment module 28 can analyze the results of such surveys and provide feedback to various other parts of the system 2.

Risk Assessment

As described above, one embodiment of the present invention includes risk assessment, analysis, reporting, and management functionality provided by the risk management module 24. One embodiment of the risk management module is now described with reference to FIG. 3. Risk management module 24 includes an interface module 42 to allow communications between the risk management module 24 and the various other modules of the compliance management system 2, as will be discussed in more detail below.

Figure 3:
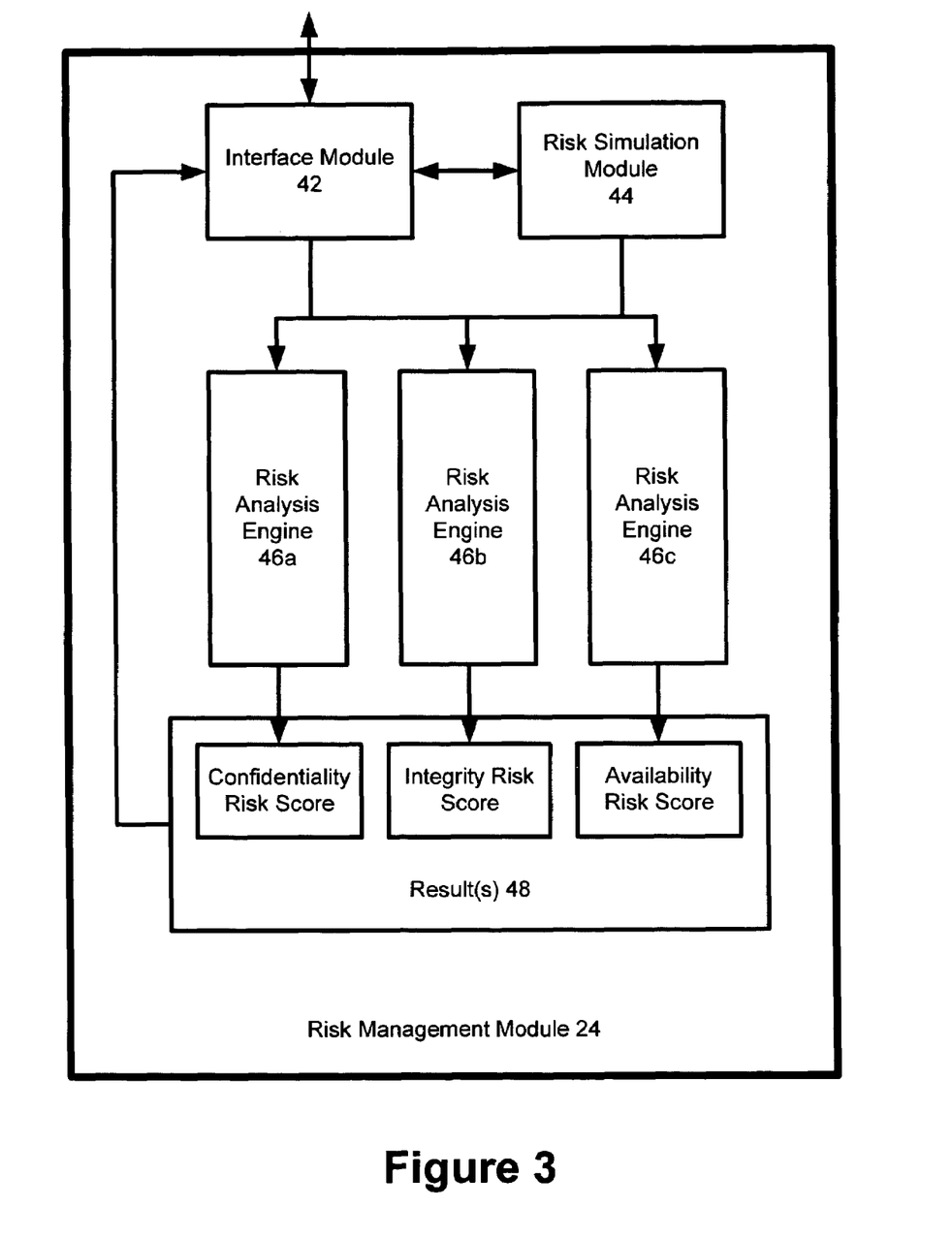
FIG. 3 is a block diagram illustrating a risk management module according to one embodiment of the present invention.

In one embodiment, the interface module collects 42 collects data from the asset module 20, the policy module 22, and the self assessment module 28, and is managed and produces results vial the user interface 16. In one embodiment, risk is associated with individual assets, such as machines (laptops, desktops, servers, routers), applications (ESM, SAP), people, and other asset types. Thus, in one embodiment, when the risk of an asset is to be assessed, the interface module collects various risk factors for the asset.

Various embodiments of the present invention can use different risk factors for risk assessment; the invention is not limited to any specific factor or set of factors. In one embodiment, the risk factors collected include the impact of the asset, a measurement of the assets importance to the business. The impact, or business impact, of an asset can be broken down into three categories. One impact category is confidentiality; an asset whose confidentiality is very important would have a higher impact than one that does not contain any secrets. Another impact category is integrity, a measure of the business impact of compromise in the authenticity of information or data related to the asset. Yet another impact category is availability, a measure of the business impact of the asset being "offline," or otherwise unavailable. There could be additional categories, or different impact categorizations used.

Another risk factor can be the vulnerability of the asset. A measure of asset vulnerability can be imported by the compliance management system 2 through one of its software interfaces, and collected by the interface module 42 from the compliance management system 2. For example, a vulnerability score for the asset can be imported from a vulnerability scanner such as Nessus.

Another risk factor can be the number of SIM incidents associated with the asset by some SIM product. This measurement may be of SIM trouble tickets or security event within some time window, or for a real-time risk measurement, this measurement can be the number of open tickets in the SIM product for the asset. Another risk factor can be the compliance score associated with the asset by the policy module 22, which itself in a measure of the compliance of the asset with the policies being enforced by the compliance management system 2. Yet another risk factor can be the result of a risk assessment survey completed by a person about the asset. There can be various other risk factors related to an asset, such as whether the asset is managed by the compliance management system 2 using an agent resident on the asset, whether the asset is internal (behind a firewall and not exposed to the outside) or external, and other such considerations.

In one embodiment, the collected data representing the various risk factors is provided to one or more risk analysis engines 46. In one embodiment—illustrated in FIG. 3—three risk analysis engines 46a-c are used, but the invention is not limited to any specific number of risk analysis engines 46, which could range from 1 to any number, although in a real world system their numbers are likely to be between 1 and 10. The risk analysis engine 46 calculates a risk score of the asset. The risk score can be expressed as a percentage, with higher percentages indicating higher risk.

In one embodiment using three risk analysis engines, each risk analysis engine 46 outputs one of a confidentiality risk score, an integrity risk score, and an availability risk score, representing the risk associated with these asset impacts described above. For example in FIG. 3, risk analysis engine 46a is given the confidentiality impact of the asset as an input and thus outputs the confidentiality risk score of the asset. Similarly, in FIG. 3, risk analysis engine 46b is given the integrity impact of the asset as an input and thus outputs the integrity risk score of the asset, and risk analysis engine 46c is given the availability impact of the asset as an input and thus outputs the availability risk score of the asset.

These determined risk scores are the results 48 of the risk management module. The results can be combined to produce a single result 48 if desired, or all separate results produced can be delivered to the interface module 42 for presentation to an administrator or risk analysis professional via the user interface 16. In another embodiment, all the various categories of impact scores can be provided as input to a singe risk analysis engine 46 to provide a singe risk score for the asset. In yet another embodiment, inputs for the various risk analysis engines 46 may not overlap at all, or only overlap partially.

Risk Factor Mapping and Statistical Modeling

Figure 4:
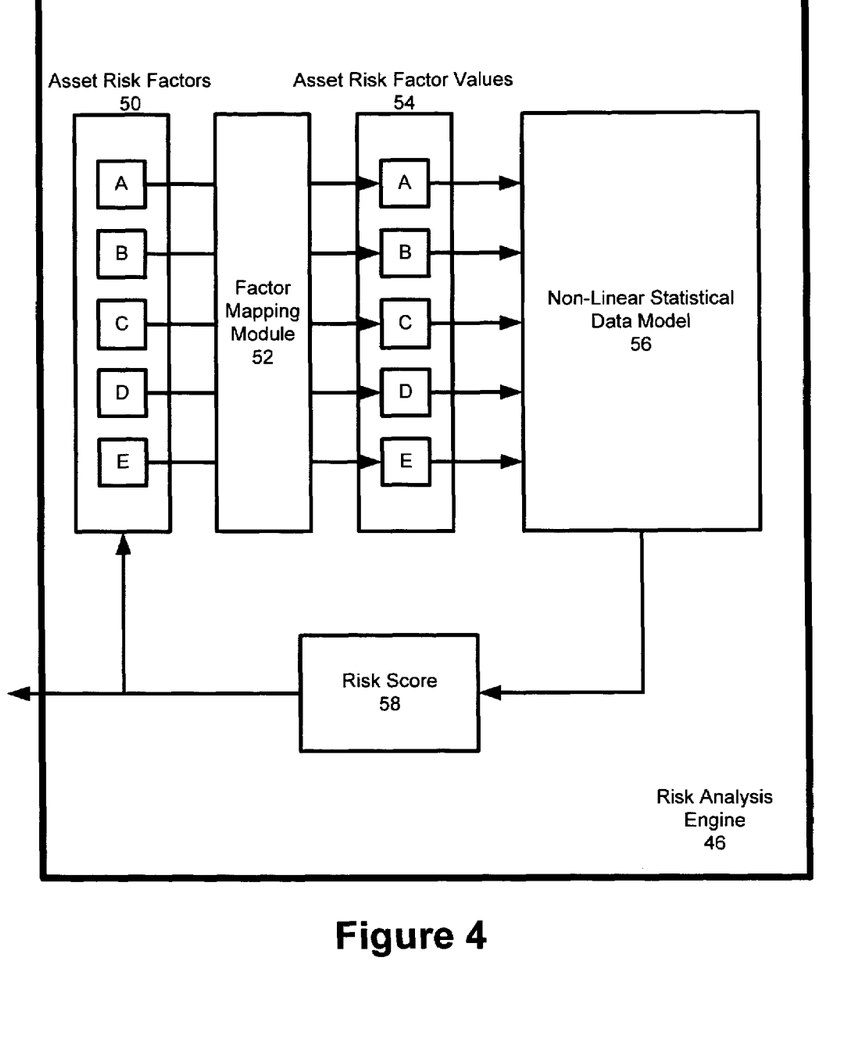
FIG. 4 is a block diagram illustrating a risk analysis engine according to one embodiment of the present invention.

In one embodiment, described with reference to FIG. 4, the present invention uses a non-linear statistical data model to calculate the risk associated with an asset. Such non-linear statistical data models include neural networks, decision trees, Bayesian networks, genetic algorithms, and several other types of non-linear statistical data models. In one embodiment, the non-linear statistical data model 56 used by the risk analysis engine 46 is a neural network (sometimes referred to as a neural net). Neural network have numerous applications, for example, they are used to determine people's credit scores based on information about them such as number of credit cards, late payments, income, and so on. The concept of neural networks and other such statistical data models are well-known and familiar to one skilled in the art.

In one embodiment, the various asset risk factors 50 collected by the interface module 42 are first mapped to asset risk factor value 54 to facilitate their input into the non-linear statistical data model 56. In one embodiment, mapping the asset risk factors 50 to the asset risk factor values is performed by the factor mapping module 52. The map performed by the factor mapping module 52 may be user configurable, and it can be specific to the type of asset.

One function of the factor mapping module 52 is to convert the asset risk factors to a format that is usable by the non-linear statistical data model 56. For example, a vulnerability factor may return a "medium" vulnerability for the asset. However, in one embodiment, the non-linear statistical data model 56 works on numbers. Thus, the factor mapping module 52 can convert the "medium" vulnerability into a vulnerability value. In this manner, non-numeric asset risk factors 50 can be mapped to numeric asset risk factor values 54.

However, the factor mapping module 52 can also map numeric asset risk factors 50 to numeric asset risk factor values 54. This can be useful to limit inputs to a specific range or a specific set of values. For example, one asset risk factor discussed above is the number of SIM incidents related to the asset. While this risk factor is numeric, it can be more useful to convert this number to a value expressing the relative number of incidents for this asset, for example on a scale of 1 to 10.

In one embodiment, the factor mapping module's 52 map is configurable by the system administrator. For example, whether 1000 SIM incidents maps to 6 or 8 (or any other value), or whether a "medium" vulnerability is twice or ten times as important as a "low" vulnerability, can all be configured. In this manner each administrator can configure the risk analysis engine 46 according to his need.

In one embodiment, the asset risk factor values are provided as input for the non-linear statistical data model 56, which produces an output. The output of the non-linear statistical data model 56 is the risk score 58 determined by the risk analysis engine 46. The risk score 58 may be any one of the results 48 shown in FIG. 3, such as the confidentiality risk score, integrity risk score, availability risk score, some other risk score, or one unified risk score for the asset.

As mentioned above, in one embodiment, the non-linear statistical data model 56 is implemented as a neural network. There are numerous software-implemented neural networks available including both proprietary software and open-source software. In one embodiment, the non-linear statistical data model 56 is implemented using the open-source neural network Joone.

A neural network is defined largely by the number of inputs, the output layer, and the hidden layers. In one embodiment, the neural network of the non-linear statistical data model 56 has one input for each of the risk factors listed above (with one risk factor associated with impact whose category depends on which risk analysis engine is used), thus having seven inputs, a linear output layer, and two sigmoid hidden layers of ten nodes each. However, the neural network can be set up in numerous other ways, with different number of inputs, layers, and layer types.

In one embodiment, the neural network making up the non-linear statistical data model 56 needs to be trained before it functions accurately. One way to train the non-linear statistical data model 56 is to provide various information technology, network security, and compliance expert with various sets of sample data to evaluate. The sample data and the expert evaluations can then be fed into the non-linear statistical data model 56 which can train itself using a feedback mechanism. In this manner, the risk management module 24 is able to express a consensus of expert opinion rather that the opinion of just one expert. Furthermore, the non-linear statistical data model 56 can be continuously trained and refined with additional expert training.

Figure 5:
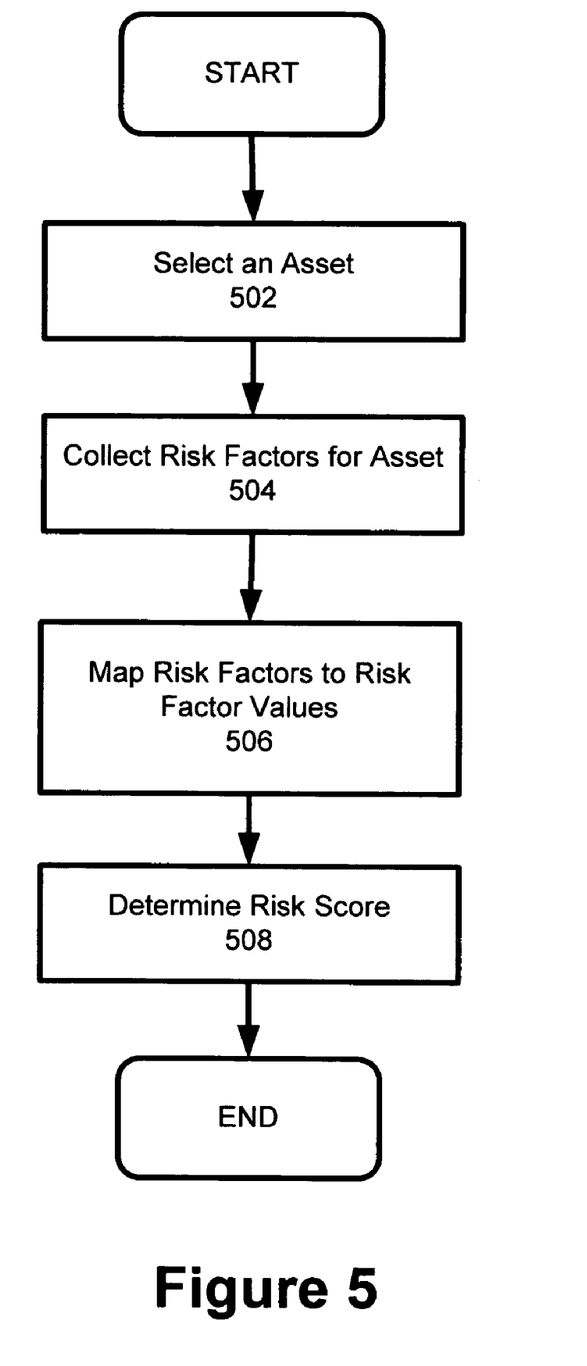
FIG. 5 is a flow diagram illustrating operation of the risk management module according to one embodiment of the present invention.

One embodiment of the operation of the risk management module 24 is now described with reference to FIG. 5. In block 502 one of the enterprises' assets is selected for risk assessment. In one embodiment, the asset is selected from a pool of heterogeneous assets, since the enterprise will have assets of many types and categories, such as various types of machines, applications, facilities, and other assets. However, as described above, the risk analysis engine of one embodiment of the present invention can handle various types of assets, unlike the prior art pre-defined formula type risk analysis.

Asset selection can be performed in a number of ways. For example, a system administrator, risk assessment expert, or other user of the system can indicate the selection via the user or console interface. The user interface can provide a graphical browser interface to allow a user to graphically select a representation of an asset for risk analysis. Thus, in one embodiment, selecting the asset is block 502 means receiving such a selective indication from a system user. The selection can also be performed by a scheduler or other application that conducts periodic risk assessments of various assets.

In block 504, the risk factors for the asset are collected. These can include all the risk factors discussed above, or any additional risk factors. Any attribute associated with an asset can be a risk factor; risk factor is merely a term describing those asset attributes or related information that is deemed relevant for risk analysis. As assets may develop new attributes or may have new information available about them, all such attributes and information may be considered a risk factor.

In block 508, the collected risk factors for the asset are mapped to the risk factor values discussed above. In one embodiment, the mapping is configurable. The risk factor values are in a format that can be provided as input to a neural network, or some other type of non-linear statistical data model, such as genetic algorithm or a Bayesian network. In this manner, in block 508, a risk score is determined using the neural network of other type of non-linear statistical data model. The risk score can represent one specific type of risk, or may be an aggregate risk score. It may be in the form of a percentage, or on any other scale. Before delivered to the system user, the risk score can be converted to a verbal status, such as MEDIUM RISK, a color code, or some other indicator.

Risk Simulation and Mitigation

Referring again to FIG. 3, in one embodiment, the risk management module includes a risk simulation module 44. An administrator can access the risk simulation module 44 through the interface module 42 to simulate risk scenarios in order to study the effect of change on risk. For example, the administrator may deem the current risk score associated with an asset as too high. However, the administrator may not know the most effective and least costly way to lower to risk score into an acceptable range. A determinative formula or model would give no additional information and the administrator would not be able to assess whether the action in real life would have the same effect as shown by the determinative model.

However, in one embodiment, the inputs provided by the administrator to the risk simulation module are provided to the same risk analysis engine 46 used to calculate the risk scores. As described above, in one embodiment, the risk analysis engine 46 uses a non-linear statistical data model 56 to determine the risk score for the asset. In one embodiment, the non-linear statistical data model 56 is used to implement a learning-algorithm in the form of a neural network. Thus, the simulated risk score produced by the risk analysis engine 46 from the simulated data from the risk simulation module 44 reflects information not previously available to, and perhaps not expected by, the administrator.

Figure 6:
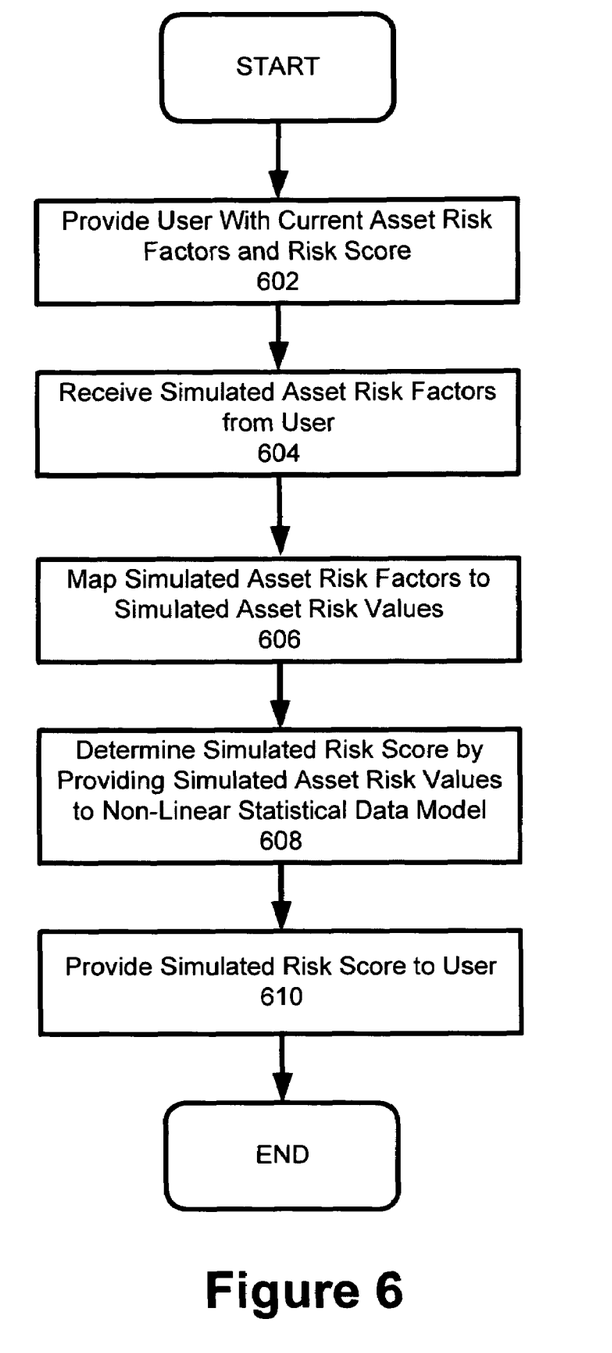
FIG. 6 is a flow diagram illustrating operation of the risk simulation module according to one embodiment of the present invention.

One embodiment of the risk simulation module is now described with reference to FIG. 6. In block 602 the administrator—who can also be referred to as the user of the system—is provided the current asset risk factors and current risk score via the user interface. In one embodiment, the user interface can include a risk simulation interface to graphically display this information. The current asset risk factors and the current risk score can be collected from the risk analysis engine by the risk simulation module.

In one embodiment, the graphical risk simulation interface allows the user to change the risk factor values displayed to the user in block 602. The changed values will be used as simulated asset risk factors to create a hypothetical situation and study the risk impact of the simulated asset risk factors. The interface can also include a tool, such as a button, to return the risk factors to the current real-life values. In block 604 the simulated asset risk factors input by the user are received by the risk simulation module.

The risk simulation module provides that simulated asset risk factors to the risk analysis engine as if they were real live asset risk factors. In one embodiment, the risk analysis engine performs the same function on simulated asset risk factors as real live asset risk factors. Thus, in one embodiment, in block 606, the simulated asset risk factors are mapped to simulated asset risk values. In block 608, a simulated risk score is determined using the non-linear statistical data model. In one embodiment, the simulated risk score is provided back to the risk simulation module, instead of being displayed or further processed as a real live risk score by the risk assessment module.

In block 610, the risk simulation module uses the risk simulation interface to display the simulated risk score to the user. The simulated risk score can be displayed concurrently with the real live risk score. In this manner, a user can see the risk impact of changing asset risk factors.

The impact observed—the difference between the real risk score and the simulated risk score—is a non-determinative result and is information not otherwise available to the user. Were a determinative model used instead, the same simulated asset risk factors would consistently show the same simulated asset risk score without regard to the specific asset, asset type, network, system, organization, time, or any other variable about which a learning algorithm like a non-linear statistical data model can learn information.

Example Computer System

Various embodiments of the present invention have been described in the context of a server that performs compliance, security, and risk management functionalities, and a browser/console interface operable to access and view those functionalities. An example computer system on which such server and/or console interface can be implemented in now described with reference to FIG. 7. Numerous features described with reference to FIG. 7 can be omitted, e.g., a server will generally not include video display unit 1810. Computer system 1800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

Figure 7:
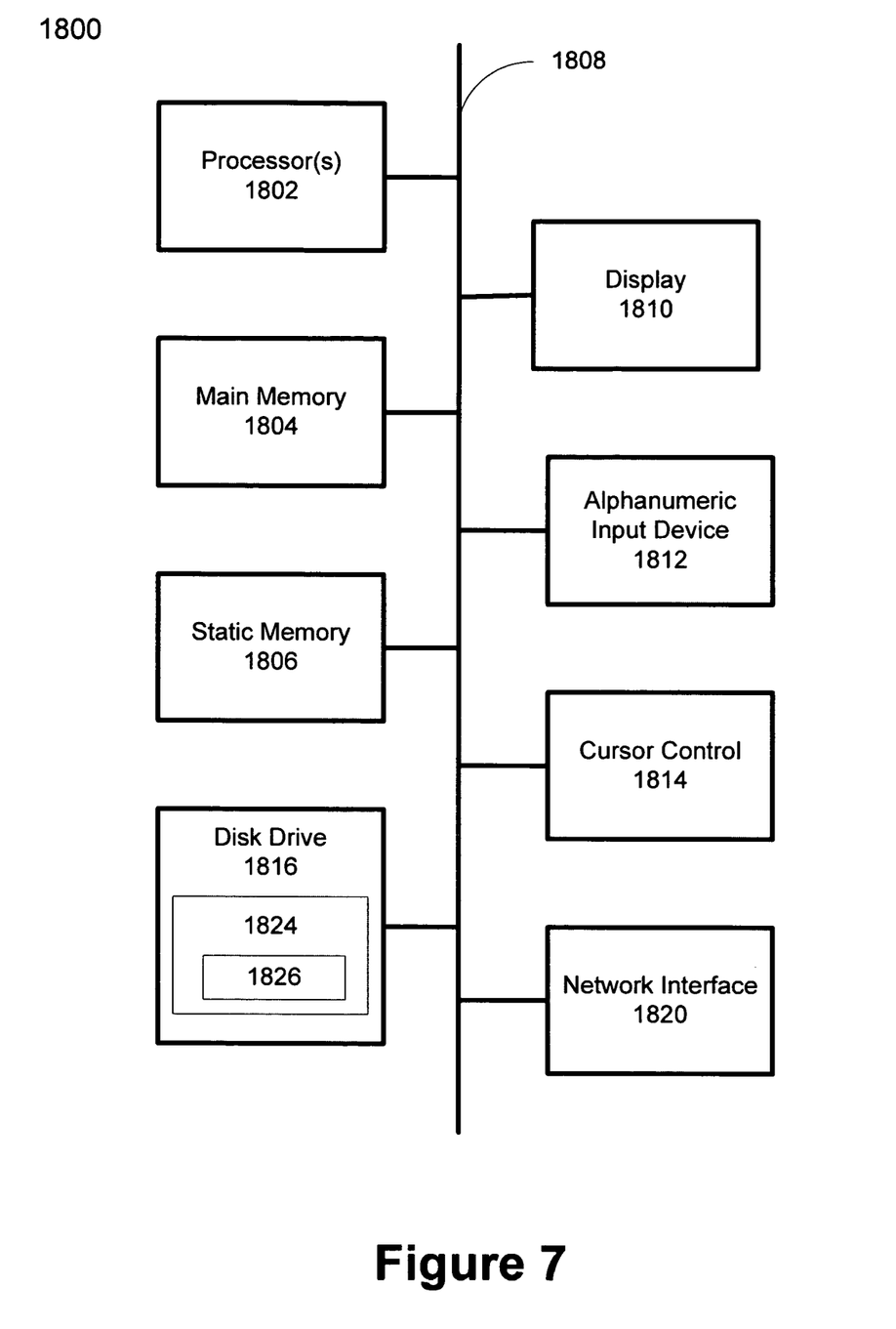
FIG. 7 is a block diagram illustrating an example computer system according to one embodiment of the present invention.

The computer system 1800 includes a processor 1802, a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alpha-numeric input device 1812 (e.g., a keyboard), a cursor control device 1814 (e.g., a mouse), a disk drive unit 1816, and a network interface device 1820.

The disk drive unit 1816 includes a machine-readable medium 1824 on which is stored a set of instructions (i.e., software) 1826 embodying any one, or all, of the methodologies described above. The software 1826 is also shown to reside, completely or at least partially, within the main memory 1804 and/or within the processor 1802. The software 1826 may further be transmitted or received via the network interface device 1822. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to include, but not be limited to, solid-state memories, optical and magnetic disks, and carrier wave signals.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computer implemented method of assessing risk associated with one or more assets for a business enterprise by comparing a non-determinative real risk score with a non-determinative simulated risk score, comprising the steps of:

providing a compliance management system on one or more computers, wherein said one or more computers are connected to a network of said assets for allowing said compliance management system to access said network;

selecting an asset from said assets using the compliance management system;

providing a non-linear statistical data model, wherein said non-linear statistical data model is self-trainable using a feedback mechanism;

generating said non-determinative real risk score using the non-linear statistical data model by a risk analysis engine associated with the compliance management system, further comprising:

collecting one or more risk factors associated with said selected asset;

mapping the risk factors to risk factor values;

generating said non-determinative real risk score for the asset by providing said risk factor values to said non-linear statistical data model, the non-determinative real risk score being a measure of risk associated with the selected asset;

generating said non-determinative simulated risk score using the non-linear statistical data model by said risk analysis engine, comprising:

collecting one or more simulated risk factors associated with the selected asset, wherein the simulated risk factors further comprise one or more of simulated risk factors received by a risk simulation module and risk factors configured by a user using a user interface;

mapping said simulated risk factors to simulated asset risk values;

generating said non-determinative simulated risk score using said simulated asset risk values, wherein the non-determinative simulated risk score is a simulated measure of risk associated with the selected asset if the selected asset were to be associated with the simulated risk factors; and, assessing said risk of the selected asset using the compliance management system, wherein said step of assessing the risk comprises comparing the non-determinative real risk score with the non-determinative simulated risk score by one or more of the compliance management system and said user of the compliance management system using said user interface;

whereby assessing the risk of the selected asset by comparing the non-determinative real risk score with the non-determinative simulated risk score enables the user to manage risk and compliancy of the assets of said business enterprise.

2. The method of claim 1, wherein the non-linear statistical data model comprises a neural network, and wherein the neural network comprises a Bayesian network, a decision tree, and a genetic algorithm.

3. A graphical user interface on a computer system for assessing risk associated with a plurality of heterogeneous assets of a business enterprise, the graphical user interface comprising:
   a graphical tool to allow a user to select an asset from said plurality of heterogeneous assets on said computer system;
   a display unit that displays a plurality of real risk factors associated with the asset;
   said display unit that displays a real risk score associated with the asset, the real risk score being a measure of risk associated with the asset;
   an input area to allow a user to input a plurality of simulated risk factors for the asset using an input device of the computer system; and
   said display unit that displays a non-determinative simulated risk score associated with the asset, the simulated risk score being a simulated measure of risk associated with the asset if the selected asset were to be associated with the plurality of simulated risk factors.

4. The graphical user interface of claim 3, wherein the input area comprises a plurality of input boxes displaying the plurality of real risk factors that allow the user to alter one or more of the plurality of real risk factors by replacing it with one or more simulated risk factors.

5. The graphical user interface of claim 4, wherein simulated risk factors are displayed in a color different from real risk factors.

6. The graphical user interface of claim 4, further comprising a tool to reset the plurality of simulated risk factors to the plurality of real risk factors.

7. The graphical user interface of claim 3, wherein the simulated risk score is determined by providing the simulated risk factors to a non-linear statistical data model.

8. An apparatus for assessing risk associated with one or more assets comprising:
   a processor connected to a network of said assets for allowing said apparatus to access said network, said processor comprising:
      an asset module stored on the apparatus to collect information about an asset selected from a plurality of heterogeneous assets of a business enterprise;
      a risk assessment module stored on the apparatus to determine a plurality of risk factors from the collected information;
      a risk simulation module stored on the apparatus to receive a plurality of simulated risk factors associated with the selected asset; and
      a risk analysis engine stored on the apparatus to generate a non-determinative simulated risk score using the simulated risk factors, the simulated risk score being a simulated measure of risk associated with the selected asset if the selected asset were to be associated with the plurality of simulated risk factors.

9. The apparatus of claim 8, wherein the risk analysis engine generates the non-determinative simulated risk score by providing the plurality of simulated risk factors to a non-linear statistical data model.

10. The apparatus of claim 9, wherein the non-linear statistical data model comprises a neural network.

11. The apparatus of claim 8, wherein the risk analysis engine determines a risk score for the asset by providing the plurality of risk factors to a non-linear statistical data model, the risk score being a measure of risk associated with the selected asset; and the risk simulation module displays the risk score and the simulated risk score to a user for comparison.

12. A machine-readable medium having stored thereon data representing instructions that, when executed by a processor of a risk management system, cause the processor to perform operations comprising:
   selecting an asset from a plurality of heterogeneous assets of a business enterprise;
   receiving a plurality of simulated risk factors associated with the selected asset; and
   generating a non-determinative simulated risk score using the simulated risk factors, the simulated risk score being a simulated measure of risk associated with the selected asset if the selected asset were to be associated with the plurality of simulated risk factors.

13. The machine-readable medium of claim 12, wherein generating the non-determinative simulated risk score comprises providing the plurality of simulated risk factors to a non-linear statistical data model.

14. The machine-readable medium of claim 13, wherein the non-linear statistical data model comprises a neural network.

15. The machine-readable medium of claim 12, further the instructions further cause the processor to perform operations comprising:
   collecting a plurality of risk factors associated with the selected asset;
   determining a risk score for the asset by providing the plurality of risk factors to a non-linear statistical data model, the risk score being a measure of risk associated with the selected asset; and
   displaying the risk score and the simulated risk score to a user for comparison.

16. A computer implemented method of assessing risk associated with an asset in a business enterprise by comparing a non-determinative real risk score with a non-determinative simulated risk score, comprising the steps of:
   providing a compliance management system on one or more computers, wherein said one or more computers are connected to a network of assets for allowing said compliance management system to access said network;
   receiving said asset using said compliance management system;
   associating one or more policies with the asset using the compliance management system;
   calculating a compliance score for the asset based on said associated policies;
   generating said non-determinative real risk score for the asset by a risk analysis engine based on said calculated compliance score using one or more non-linear statistical data models, wherein said non-linear statistical data models are self trainable using a feedback mechanism;

generating said non-determinative simulated risk score for the asset by said risk analysis engine based on the calculated compliance score using said non-linear statistical data models; and comparing said determined non-determinative real risk score with said determined non-determinative simulated risk score by the compliance management system;

whereby the risk is assessed for the asset to manage risk and compliancy of the asset.

17. The method of claim 16, wherein said compliance score is a measure of compliance of the asset with the policies enforced by the compliance management system.

18. The method of claim 16, wherein the non-linear statistical data models comprises a neural network.

19. A computer implemented system for assessing risk associated with an asset in a business enterprise, comprising:

a compliance management system implemented on one or more computers, said one or more computers connected to a network of assets for allowing said compliance management system to access said network, said compliance management system comprising:

an asset module stored on said one or more computers for receiving said asset;

a policy module stored on said one or more computers for associating one or more policies with the asset and for calculating a compliance score for the asset based on said associated policies;

a risk management module stored on said one or more computers for determining a non-determinative real risk score for the asset based on said calculated compliance score using a non-linear statistical data models and for determining a non-determinative simulated risk score for the asset based on the calculated compliance score using said non-linear statistical data models; and a user interface on said one or more computers for comparing said determined non-determinative real score with said determined non-determinative simulated risk score.

20. The computer implemented system of claim 19, wherein said compliance management system comprises a self-assessment module for maintaining and accessing a plurality of self-assessment surveys.

21. The computer implemented system of claim 20, wherein said user interface comprises a notification module for sending alerts and reports regarding compliance management and risk analysis.

22. A computer implemented method of assessing risk associated with one or more assets for a business enterprise by comparing a non-determinative real risk score with a non-determinative simulated risk score, comprising the steps of:

providing a compliance management system on one or more computers, wherein said one or more computers are connected to a network of said assets for allowing said compliance management system to access said network;

selecting an asset from said assets using the compliance management system;

providing a non-linear statistical data model, wherein said non-linear statistical data model is self-trainable using a feedback mechanism;

generating said non-determinative real risk score using the non-linear statistical data model;

generating said non-determinative simulated risk score using the non-linear statistical data model; and, assessing said risk of the selected asset using the compliance management system, wherein said step of assessing the risk comprises comparing the non-determinative real risk score with the non-determinative simulated risk score by one or more of the compliance management system and said user of the compliance management system using a user interface;

whereby assessing the risk of the selected asset by comparing the non-determinative real risk score with the non-determinative simulated risk score enables the user to manage risk and compliancy of the assets of said business enterprise.

* * * * *